United States Patent Office 2,810,438
Patented Oct. 22, 1957

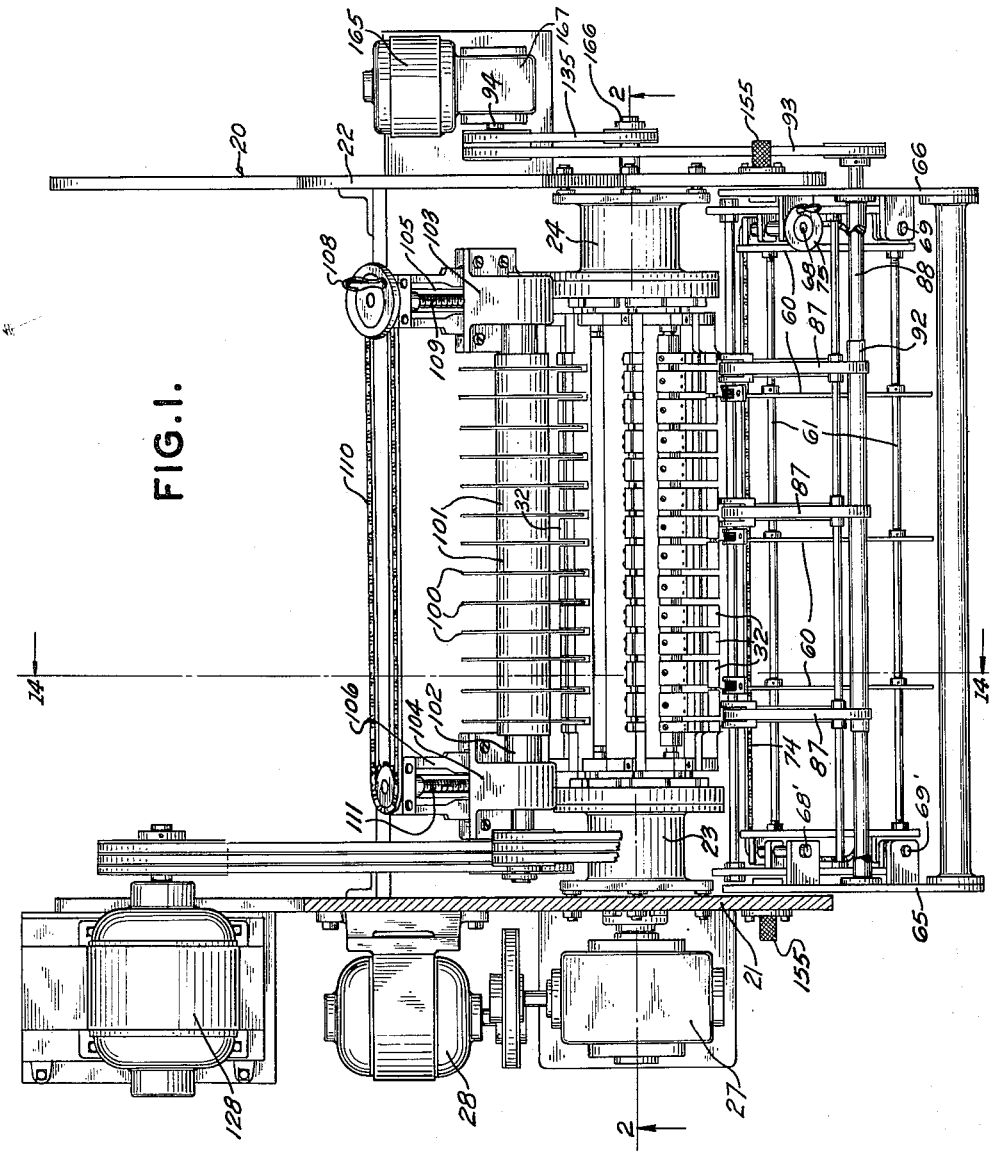

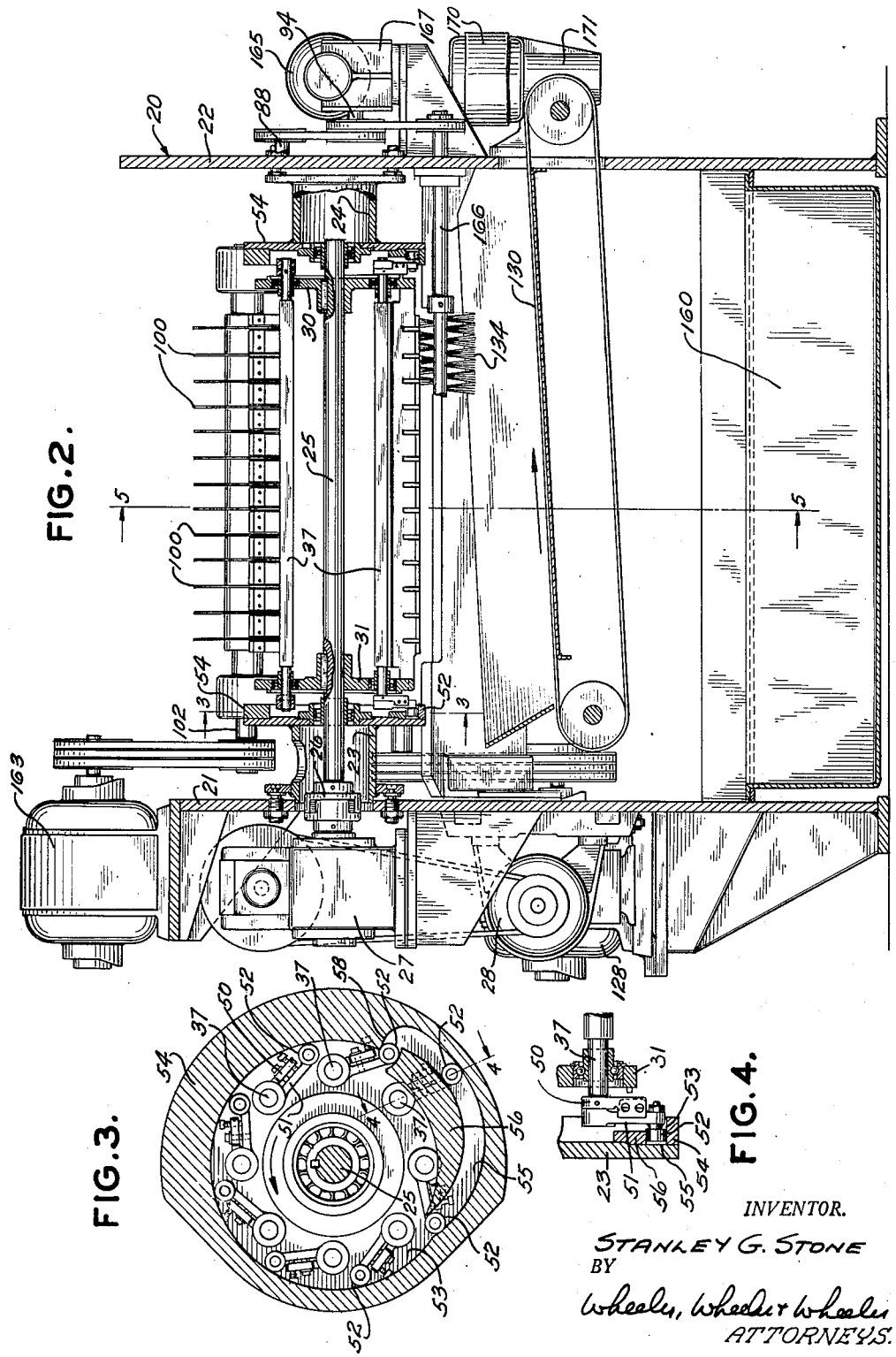

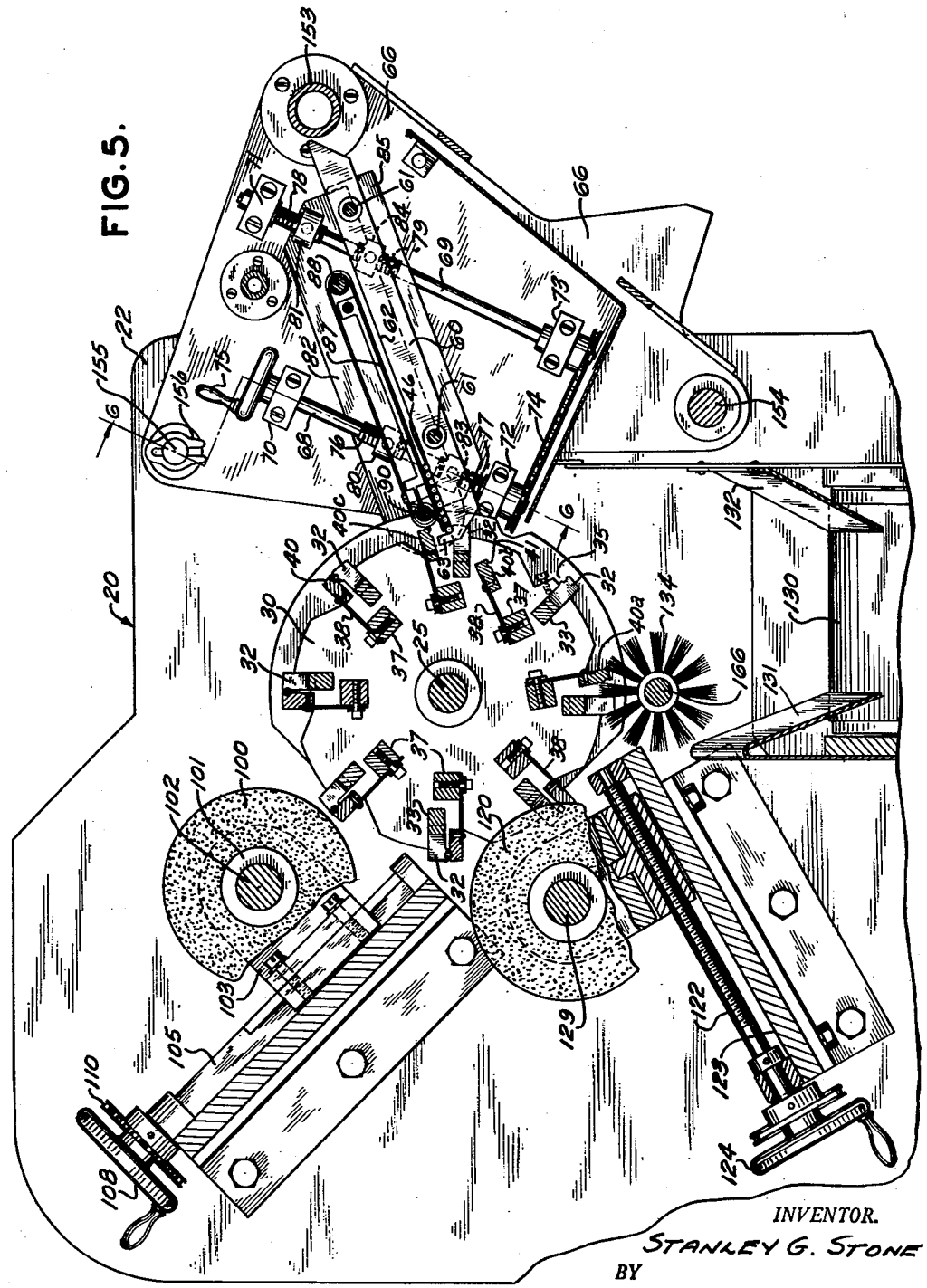

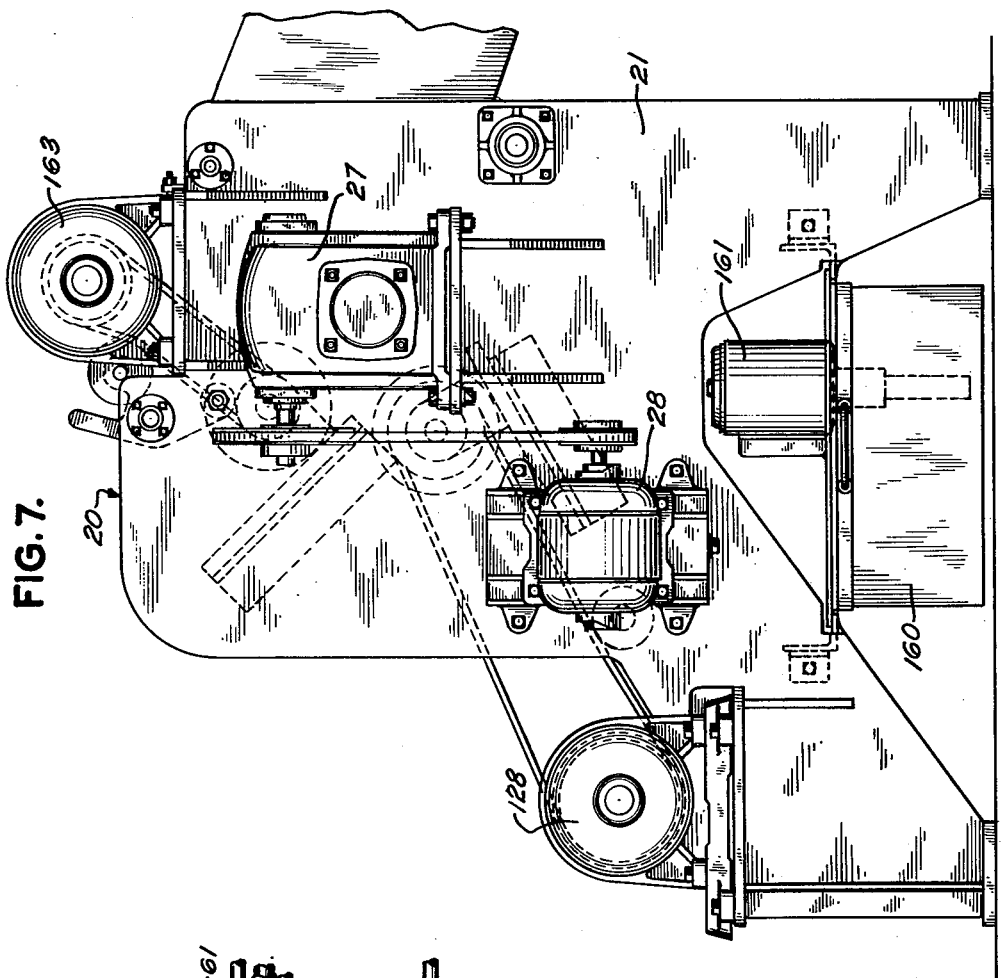
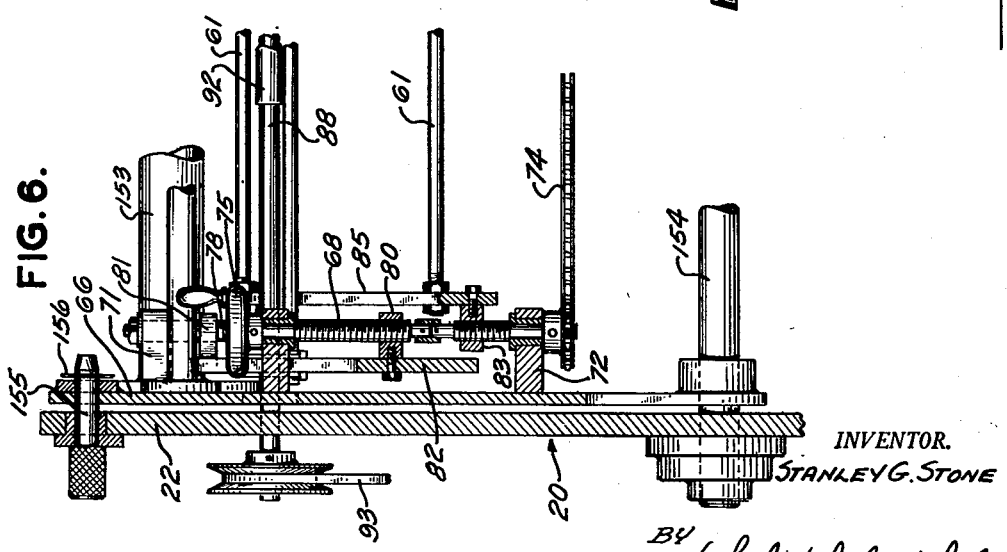

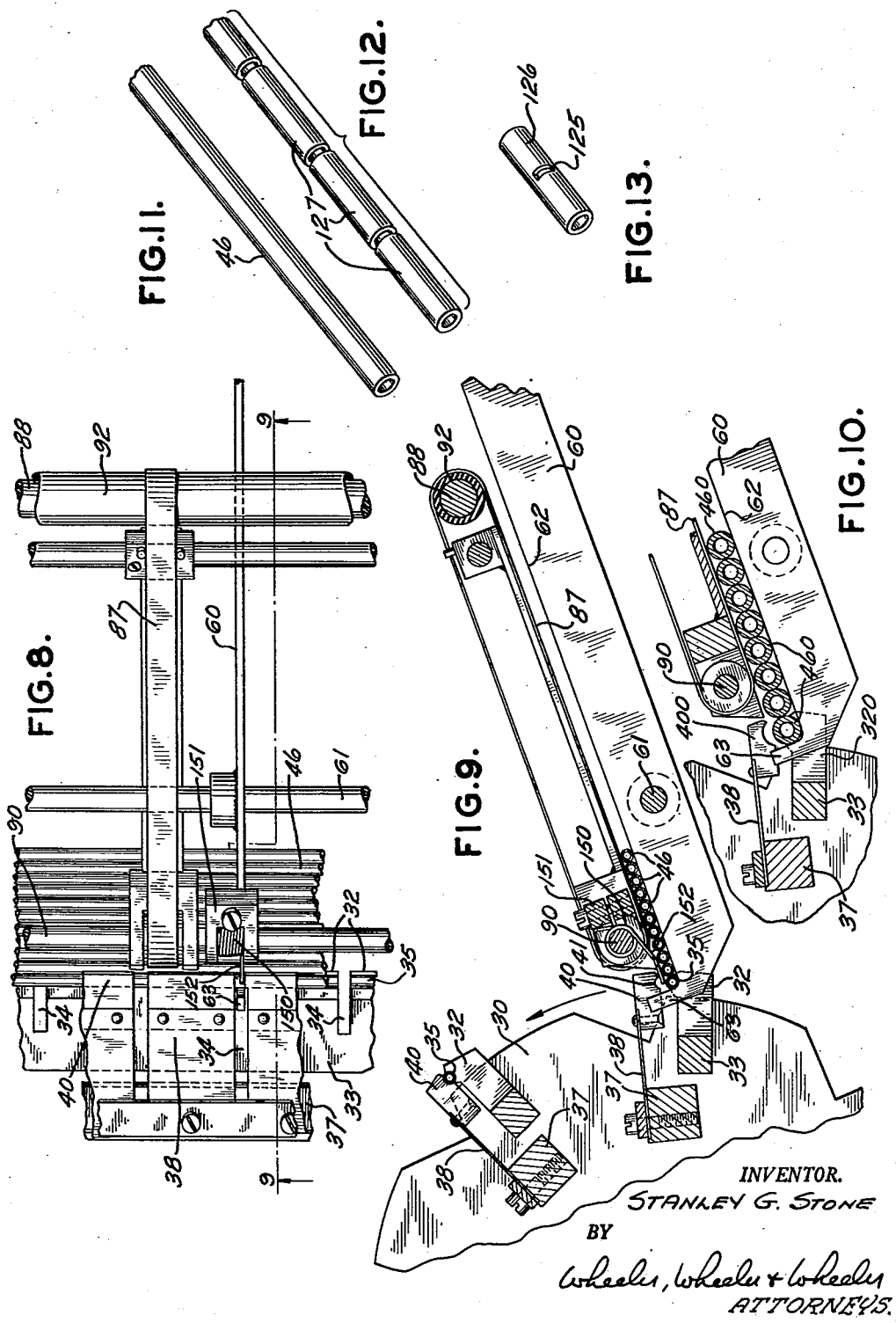

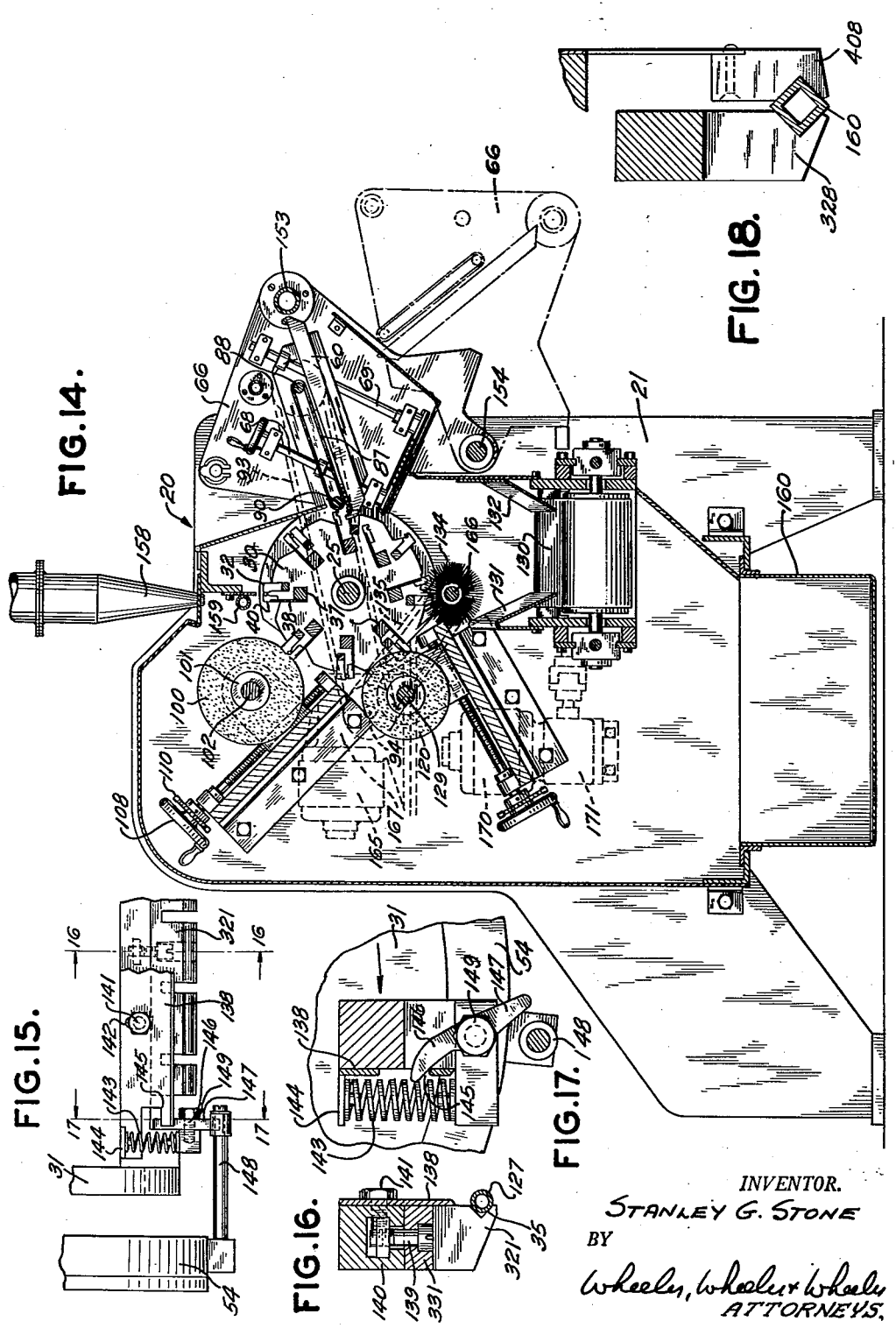

2,810,438

MACHINE FOR AUTOMATICALLY FEEDING, CLAMPING AND CUTTING WORK PIECES

Stanley G. Stone, Chicago, Ill.

Application June 22, 1955, Serial No. 517,161

15 Claims. (Cl. 164—61)

This invention relates to a machine for automatically feeding, clamping and cutting work pieces into short lengths.

The invention will be described with particular reference to the production of extremely short pieces of tubes of fiber or the like, these presenting particularly difficult problems in economical manufacture. It will be understood, however, that the invention thus exemplified is also well adapted to cut short lengths of rods, dowels, or tube or even moulding or the like of non-circular cross section, with no substantial change in the apparatus used except to conform the jaws to the work.

The clamping jaws substantially completely enclose the work between cuts so that no twisting can occur and even thin walls of hollow work are supported against collapse and the resulting severed lengths are securely held until the desired release.

In the embodiment disclosed, elongated work pieces are fed into the machine down an inclined surface which functions as a hopper and leads to a station from which successive work pieces are lifted automatically by jaws mounted on a rotating turret to accommodate the cutters. The cutters may take the form of band or disk saws, knife disks or abrasive wheels, according to the work to be cut.

The jaws which lift the work pieces from the infeed hopper are adjustably fixed on the turret. Cooperating with them are movable jaws which open sufficiently widely during turret rotation so that they do not interfere with a work piece carried by the infeed hopper in a position to be engaged and lifted by the relatively fixed jaws of the turret. Immediately such a work piece is engaged to be lifted from the hopper during turret rotation, the several movable jaws engage it at points between the points at which the cutters are to operate thereon.

Each work piece is individually held between the planes in which the cutters operate. In this manner, each work piece is secured against rotation or displacement during or subsequent to its severance.

The opening movement of the relatively movable jaws releases the severed work pieces and means is provided for ejection of any of the short lengths which tend to cling to the fixed jaws so that the latter will be free to receive a new work piece when they reach the hopper.

It is an inherent advantage of the described structure that the arc of contact between the cutters and the work varies continuously as the turret moves respective work pieces past the fixed centers upon which the arbors support the cutters. This results in forming the ends of the individual severed work pieces substantially smooth and free of burrs.

In some instances, the products of the machine require that they be slotted or notched peripherally intermediate their ends and it is contemplated that an additional set of cutters may be provided for this purpose and that the jaws be so organized as to permit the use of these additional cutters which are mounted on a shaft rotatable at a fixed point at a sufficiently great radius from the axis of the turret so that the cutters only penetrate partway through the severed lengths of work to produce notches or cuts therein of any desired peripheral extent.

In the drawings:

Fig. 1 is a plan view of a device embodying the invention.

Fig. 2 is a vertical sectional view taken on the line 2—2 of Fig. 1, substantially on the turret axis, some parts being broken away.

Fig. 3 is a view taken in transverse section through the turret substantially on the line indicated at 3—3 in Fig. 2.

Fig. 4 is a detail view through one of the jaw-operating cams on the line 4—4 of Fig. 3.

Fig. 5 is a view taken on an enlarged scale in section on the line 5—5 of Fig. 2.

Fig. 6 is a detail view taken in section on the line 6—6 of Fig. 5.

Fig. 7 is a view of the machine in end elevation.

Fig. 8 is a fragmentary detail view in plan showing portions of the infeed hopper and the cooperating turret jaws.

Fig. 9 is a detail view taken in section on the line 9—9 of Fig. 8.

Fig. 10 is a fragmentary detail view similar to Fig. 9 showing the parts in slightly different positions.

Fig. 11 is a fragmentary view in perspective of a work piece such as is supplied to the machine.

Fig. 12 is a view showing in perspective a number of finished articles made from the work piece of Fig. 11.

Fig. 13 is a view in perspective showing a single article provided with a peripheral notch or slot as above described.

Fig. 14 is a detail view taken in section on the line 14—14 of Fig. 1.

Fig. 15 is a fragmentary detail view of a modified ejecting device.

Fig. 16 is a view taken in section on the line 16—16 of Fig. 15.

Fig. 17 is a detail view taken on the line 17—17 of Fig. 15.

Fig. 18 is a detail view in cross section showing jaws engaged with work of non-circular cross section.

The machine frame 20 comprises end plates 21, 22 best shown in Figs. 1 and 2. Carried by these plates and projecting toward each other are the annular supports 23, 24 which provide bearings for the turret shaft 25. This shaft is driven through coupling 26 (Fig. 2) from a speed reducer 27 powered by motor 28 (see Figs. 2 and 7).

The turret comprises heads 30 and 31 having hub portions keyed to shaft 25 to rotate therewith (Fig. 2). The turret carries relatively fixed and movable jaws which are closely spaced axially throughout the effective length of the turret. In the instant embodiment, there are eight pairs of such jaws. The fixed jaws are shown at 32 (Fig. 5 and Fig. 9) and may be mounted on a single bar 33, having intervening spaces 34 (Fig. 8) to accommodate the cutter. Each jaw has a work-receiving channel 35 parallel to the turret axis. This channel may have a small radius as shown in Figs. 8 and 9, or it may have a large radius for larger diametered work pieces as shown in the case of the jaw 320 in Fig. 10. In the case of work pieces of non-circular cross section, the channels will be contoured accordingly. See jaws 328 and 408 of Fig. 18. In any event, the jaws hold each individual work piece securely against displacement.

Oscillatably mounted in the turret heads 30 and 31 are rock shafts 37 provided with bearings in the respective heads and desirably squared intermediate the bearings. On these rock shafts are mounted spring arms 38 which support therefrom the movable jaws 40 which have at 41 channels complementary to the channels 35 to receive and clamp the work pieces 46. The spring arms 36 are sufficiently rigid to constrain the movable jaws 40 to oscillate with the supporting rock shafts 37. However, the springs are sufficiently yieldable to flex slightly in the final engagement of the jaws 40 with the work pieces whereby the final clamping action is effected through the heavy bias of springs 38.

The rock shafts 37 upon which the movable jaws are carried are provided externally of the turret heads 30, 31 with arms 50 adjustably connected with relatively movable arms 51 (see Figs. 3 and 4) which support cam follower rollers 52 engaging the cam surface 53 of a stationary cam 54 carried by the annular support elements 23, 24 from the end portions 21, 22 of the machine frame 20. The larger portion of the cam surface 53 is concentric with turret shaft 25 to hold in closed position the jaws 40 carried by the rock shaft 37. However, as the turret revolves in a clockwise direction as viewed in Fig. 3, the cam follower rollers 52 successively reach the track portion 55 which diverges outwardly, baffle 56 at the inner side of the track portion 55 constraining the successive rollers 52 to move toward a position of greater radius with respect to the turret shaft 25. This oscillates the connected rock shafts 37 in directions to move their respective jaws 40 toward the open positions respectively shown at 40a and 40b in Fig. 5. The work is released in the position of 40a in Fig. 5. At 40b the jaw 40 has reached its position of maximum opening where it is free of the infed work pieces. At 40c, the jaw has commenced to close again, having reached the return portion of the cam track 55 which is shown at 58 in Fig. 3. It will be observed that the closing movement is very rapid after the work piece has been picked up by the stationary jaw 32 as shown in Fig. 5.

The infeed hopper which delivers work pieces to the open jaws of the turret comprises a plurality of spaced ways 60 which take the form of plates mounted on cross rods 61 as shown in Figs. 1, 5, 8 and 9. The upper margin 62 of each plate provides the inclined supporting surface down which the work pieces 46 roll. The foremost work piece in the hopper stops in engagement with the fingers 63 of the respective plates which project upwardly approximately at right angles to the work-supporting margins 62 thereof. The plates are adjustable on the rods so the ends of the fingers 63 will register with the notches 34 between the jaws in the manner best shown in Fig. 8 and Fig. 1. As the turret rotates counterclockwise as viewed in Figs. 5 and 9, the relatively fixed jaws 32 will pass between the supporting rails 60 and each successive set of fixed jaws will engage one of the work pieces 46 to lift it from the rails. The closing movement of the respective upper jaws is so rapid that these are, in effect, moving counterclockwise despite the clockwise movement of the turret to engage and clamp the work pieces almost at the moment that they are being lifted from the hopper guide rails 60 as shown in Fig. 9.

The feed hopper comprises mounting plates 65, 66, respectively connected with the end plates 21, 22 of the machine frame. Upon these mounting plates are shafts 68, 69, 68', 69' respectively provided with upper bearings 70, 71 and lower bearings 72, 73. A sprocket chain 74 connects the shafts to rotate in unison and shaft 68 is provided with a hand wheel 75 for the rotation of the shafts.

These shafts carry right and left hand screw threads at 76, 77, 78, 79, as best shown in Fig. 5. Nuts 80 and 81 are engaged with screw threads 76 and 78 of the respective shafts and connected with mounting plate 82. Nuts 83, 84 are engaged with screw threads 77, 79 of the respective shafts and connected with mounting plates 85 to which the rods 61 are attached.

Movement of the rods downwardly in the hopper is effected not merely by the inclination of the guide rail 62 but by cooperating conveyor belts 87 which operate over pulleys on shafts 88 and 90 journaled in the mounting plates 82 for adjustment by the nuts 80 and 81.

Due to the inclined position of the shafts 68 and 69 which provide the screw threads along which the nuts 80, 81, 83 and 84 are moved by rotation of hand wheel 75, it will be evident that the adjustment not only varies the spacing between the propelling belt 87 and the guide rail surface 62, but also moves the entire work-guiding portions of the hopper in and out with respect to the axis of the turret shaft 25 to the end that when the larger work pieces 460 shown in Fig. 10 are to be fed into the machine, the guide rails 60 of the hopper will be moved to the left as viewed in Fig. 10 just sufficiently to maintain the larger work piece in the same axial position as the work piece 46 with respect to its radial distance from the center of the turret shaft 25. Thus, regardless of the diameter of the work piece, the point of delivery on to the jaw 320 will be the same radial distance from the center of the turret as the point of delivery of the smaller work piece 46 on to the jaw 32 (Fig. 9). The several jaws are readily interchangeable on a given turret, but to expedite changeover of the machine from one size of the work piece to another, I prefer to substitute entire turrets, each of which is equipped with jaws of the proper respective dimensions.

The shafts 88 and 90 over which the hopper belts 87 operate are desirably provided with rubber sleeves at 92, as shown in Figs. 5 and 6. One of them is desirably driven by power by means of belt 93 from motor driven shaft 94.

The rotation of the turret brings successive clamp-supported work pieces into the path of rotation of a series of cutters 100 which are so spaced by the annular spacers 101 along the supporting arbor 102 as to be disposed in the notches between the cooperating sets of jaws 40 and 32 as shown in Fig. 1. As above stated, the cutters are disks and may be of any wellknown type including saws, knife disks or abrasive wheels. The arbor shafts 102 have spaced bearings 103, 104 guided for movement along ways 105, 106 which extend toward the turret axis shaft 35 but are offset beyond the shaft in the direction of turret rotation to be tangent to a circle drawn about the turret shaft at a radius somewhat less than that described by the work pieces. In the course of turret rotation, the work pieces move tangentially with respect to the peripheries of the cutters 100, the latter reaching substantially their maximum penetration when the work pieces are on the diameter common to the cutter arbor shaft 102 and the turret shaft 35. Fig. 5 shows the cutters 100 retracted along the ways 105 by means of the hand wheel 108 which operates the screw 109. The latter is connected by means of chain 110 to the screw 111, the respective screws having threaded engagement with the bearings 103, 104 which provide the bearings for arbor shaft 102.

A similar arrangement mounts the cutters 120 (Fig. 5) for adjustment by means of screws 122 along ways provided at 123 under the control of hand wheel 124, as shown in Fig. 5. Cutters 120 are mounted and operated exactly like the cutters 100 but engage the work at a more advanced point in the rotation of the turret. One set of cutters may operate in alternation with the other or one set of cutters may produce notches as shown at 125 in the product 126 of Fig. 13 instead of effecting complete severance of products 127 as in Fig. 12.

Both sets of cutters and their arbor shafts are unitarily interchangeable with others to adapt the machine for different work.

A separate motor at 128 has belt connections as shown in Figs. 1 to drive the arbor shaft 129 which carries cutter 120, and motor 163 has belt connections to drive the arbor shaft 102 which carries cutters 100. When the jaws 40 open as above described and shown at 40a in Fig. 5, the severed work pieces drop on to the discharge conveyor belt 130, being guided thereto by side plates 131, 132. It is sometimes necessary to use some means of ejecting the work pieces from the jaws in the event that they tend to stick. In Figs. 5, 14, I have shown rotary brush means at 134 for this purpose, the brush being driven by belt 135 from shaft 94. In Figs. 15 to 17, inclusive, I have illustrated a positive ejector plate 138 mounted to slide along the face of the bar 331 which carries jaw 321. The bar 331 may be detachably connected by means of bolt 139 to a mounting bar 140 which has a cap screw 141 disposed in a slot 142 in the plate 138 for the guidance of the plate. A compression spring 143 acting on an ear 144 of the plate normally holds the plate in the retracted position illustrated in Fig. 16. A notch 145 in the plate is engaged by the rocker arm 146 to advance the plate when the opposite end 147 of the rocker arm engages the fixed stop 148 projecting from the stationary cam 54 as best shown in Fig. 15. As the turret rotates, the engagement of the end 147 with stop 148 oscillates arm 146 about its fulcrum at 149 to operate the slide 138 for the ejection of a product tube 127 which has become stuck in the jaw channel 35 as shown in Fig. 16.

A wide variety of other refinements may be included whenever needed. As one example of these, I have shown in Figs. 8 and 9 a torison spring 150 mounted in a bracket 151 immediately above one of the guide rails 60. The free end portion 152 of this spring projects into one of the slots 34 between the jaws where it engages successive work pieces and holds them in position pending the closing of the movable upper jaws. 40. In Fig. 10 where the work pieces 460 are larger, this spring and bracket are not required and these are omitted.

The machine has been used successfully to cut short lengths of molding and other items of non-circular cross section as exemplified by the work 160 of Fig. 18, the jaws 328 and 408 being complementarily contoured. In all embodiments the closed jaws securely encase the work between the saws or cutting wheels to preclude any shifting or deformation.

In order to give access to the turret for the replacement of one turret with another to accomodate different sizes of work (or for any other reason), the entire hopper assembly is pivotally movable to retracted position in which it is completely out of the way. For this purpose, the end plates 65, 66 of the hopper are rigidly connected by a tubular strut 153 and pivotally mounted on trunnion shaft 154. The assembly is maintained in the position shown in Figs. 5 and 6 by means of a retractable pin 155 which serves as a dowel to lock the hopper in its operative position but may be retracted upon withdrawal of the key 156. Upon withdrawal of this pin, the entire hopper assembly pivots downwardly to the position illustrated in dotted lines in Fig. 14.

Certain types of work require either an air blast or a water jet either to facilitate cutting or to blow away resulting dust. An air nozzle is optionally provided at 158 and a perforated pipe for water or other fluid is provided at 159 for optional use. In case the fluid is a liquid, it may be collected in a sump at 160 (Fig. 6) and recirculated by a pump motor 161 (Fig. 7).

While many of the driving connections have already been described, a discussion of all of them may be advantageous. Turret shaft 25 is driven by motor 28 through the reduction gear set 27. The upper and lower cutter disk arbor shafts 102 and 129 are respectively driven by motors 163 and 128 (Figs. 2 and 7). The shaft 88 which drives the overhead belt conveyors of the hopper receives its power from motor 165 (Figs. 1, 2 and 14) which also drives shaft 166 which carries the rotary brush 134 through reduction gear set 167. The discharge conveyor 130 is driven from motor 170 through reduction gear set 171 (Figs. 2 and 14). The recirculating pump, if required, is driven by motor 161 (Fig. 7). All motor drives are normally continuous.

I claim:

1. In a device for cutting elongated objects into lengths, the combination with a positioning support for such an object and spaced cutters mounted for operative movement at a relatively fixed point, of rotatably mounted turret means for lifting the object from the support and carrying it past said cutters to be cut into lengths thereby, said turret means including channeled jaw portions engageable with the object as the latter rests upon its positioning support, complementary jaw means movable toward and from the jaw means first mentioned, and means operable in the rotation of the turret for retracting the movable jaw means sufficiently to clear the object on the positioning support whereby the first mentioned jaw means is exposed for engagement with said object, and means for abruptly closing the movable jaw means upon the object so engaged and maintaining the object under pressure against the first mentioned jaw means during its translative movement with said turret past said cutters.

2. The device of claim 1 in which said positioning support comprises an infeed hopper and a stop limiting the movement of successive objects delivered by said hopper toward the path of movement of the first mentioned jaw means of said turret.

3. The device of claim 2 in which the hopper comprises guide surfaces leading to said stop and a cooperating conveyor means spaced from said guide surfaces and acting toward said stop for the advance of successive work pieces as the object against the stop is removed by the first mentioned jaw means of the turret.

4. The device of claim 3 in which the guide surfaces and conveyor of the hopper are provided with relatively movable mountings, in further combination with means for varying the spacing between said mountings for accommodating objects of different transverse dimensions, the spacing varying means including means for moving the suports substantially equally and oppositely whereby to maintain substantially constant, irrespective of the transverse dimension of the object, the position at which successive objects are centered for engagement by the first-mentioned jaw means of the tread.

5. In a device of the character described, the combination with means for the infeeding of successive elongated work pieces, of means defining a pickup position to which successive work pieces are advanced, a turret having sets of relatively fixed jaws transversely channeled to pick up successive work pieces from said position, said turret being provided with means for its rotation, cutter means spaced axially of the turret and disposed in the path of translated movement of successive work pieces with the turret, said jaw means including spaced portions accommodating said cutter means, relatively movable jaw means mounted for oscillation upon the turret to and from work piece clamping positions and associated with the jaw means relatively fixed on the turret as first mentioned, and means effective in the course of turret rotation for retracting the respective relatively movable jaw means to positions remote from their respective fixed jaw means to clear the positions of successive work pieces approached by the relatively fixed jaw means, and means for effecting the advance of each successive retracted movable jaw means into engagement with the work piece picked up by its respective fixed jaw means and maintaining such work piece clamped upon the jaw means first mentioned during translative movement of the work piece past said cutter means.

6. The device of claim 5 in further combination with means for mechanically dislodging the severed lengths of each successive work piece from the relatively fixed jaw means of the turret upon retraction of the relatively movable jaw means complementary thereto.

7. The device of claim 5 in which the turret jaw means have channels extending axially of the turret and of dimensions to accommodate work pieces of specific cross section, the turret jaw means being interchangeable with jaw means having channels to receive work pieces of different dimension, the hopper being mounted for bodily displacement to afford access to the turret.

8. In a device for translating successive work pieces from an infeed station past a cutter, the combination with a carrier frame for effecting such translation, of jaw means relatively fixed in the carrier frame and movable therewith past said station for picking up a work piece therefrom and complementary jaw means mounted for oscillation on the carrier frame and movable to and from clamping engagement with successive work pieces picked up by the jaw means first mentioned, said complementary jaw means including a rock shaft, a cam follower connected therewith for the oscillation thereof, means providing an operating cam in the path of movement of the follower in the course of carriage movement, a spring projecting from said rock shaft, and a jaw member carried by said spring from said rock shaft and moved thereby upon the oscillation of the rock shaft to and from resilient clamping engagement with such work pieces.

9. The device of claim 8 in further combination with an infeed hopper having guide surfaces leading to said station and stop means in the path of advancing work pieces to define said station, said stop means and jaws having complementary spacing for clearance in the movement of said frame, the upper guide surfaces comprising relatively fixed surfaces and an opposing belt, a subframe having pulleys for the belt, a second subframe supporting said relatively fixed surfaces, and means for effecting relative movement between the first and second subframes for varying the spacing between the fixed surfaces and the belt.

10. A device of the character described comprising the combination with a turret mounted for rotation and provided with means normally maintaining it in continuous rotation, said turret comprising generally radial jaws in annular series and transversely channeled near their outer ends, each such jaw including outer terminal portions mutually spaced in a direction axially of the turret, rock shafts mounted in the turret inwardly of said jaws, movable jaws complementary to the jaws first mentioned and having means supporting them from respective rock shafts for oscillation toward and from the first mentioned jaws, cam follower means connected with the rock shaft, fixed cam means disposed in the path of movement of the cam follower means in the course of turret rotation and formed to effect rock shaft oscillation to open and close the movable jaws with respect to the jaws first mentioned, said cam means including means for effecting opening movement of the complementary jaws sufficiently widely to leave the outer terminal portions of the first mentioned jaws fully exposed for picking up successive work pieces at a predetermined station, means for positioning work pieces at said station, said means being disposed in spaces between portions of said first mentioned jaws, said cam means further including means for clamping work pieces immediately following their engagement by the first mentioned jaws in the course of turret rotation, and cutter means disposed between spaced portions of the first mentioned jaws to act on successive work pieces in the course of turret rotation.

11. The device of claim 10 in which cutter means comprises a plurality of sets of cutters angularly offset in the direction of turret rotation for successive operation upon work pieces clamped between the complementary jaws and the jaws first mentioned, the angularly offset cutter means having different radial spacing from the axis of rotation within the over-all radius at which work pieces are carried, whereby to cut through successive work pieces to differing extents.

12. A device of the character described comprising a machine frame having spaced end members, a turret shaft extending between said members and mounted for rotation, a turret mounted on said shaft for rotation therewith and comprising generally radial jaws having transversely notched terminal portions spaced axially of the turret shaft, said jaws being arranged in annular series about said shaft, rock shafts mounted on the turret, relatively movable jaws complementary to the jaws first mentioned and having correspondingly spaced portions, means supporting the relatively movable jaws from the respective rock shafts, means for rotating the turret, means for oscillating the rock shaft in the course of turret rotation for effecting opening and closing movements of the movable jaws with respect to the relatively fixed jaws, means for feeding elongated work pieces toward said turret and including positioning stop means for locating successive advanced work pieces in a pickup station in the path of movement of successive relatively fixed jaws, the means for oscillating the respective rock shafts including means for maintaining the relatively movable jaws sufficiently remote from the relatively fixed jaws at said station to avoid contact with successive work pieces at said station and further including means for closing the relatively movable jaws upon successive work pieces immediately upon their engagement by relatively fixed jaws of said turret, and cutter means disposed in the path of translative movement of work pieces clamped between said jaws in the course of turret rotation, said cutter means being spaced to enter between spaced portions of said jaws for engagement with work pieces clamped therebetween.

13. The device of claim 12 in which the work piece feeding means comprises a carrier having fixed rails extending toward the turret, a complementary carrier provided with cross shafts, and conveyor means operating over the cross shaft, nuts connected with the respective carriers, and adjusting means having operatively pinched threads engaged with respective nuts for the concurrent adjustment of the carriers, one of said carriers having fixed terminal stop means defining the pickup station from which successive work pieces are lifted by the fixed jaws of the turret and the disposition of said shaft means being angular with respect to the path of movement of work pieces toward said turret whereby adjustment between said carriers to accommodate work pieces of different dimensions also adjusts said stop means toward and from the turret shaft.

14. The device of claim 12 in which the cutter means comprises a series of disks and arbor shaft upon which the disks are mounted, and bearing means for the arbor shaft having means for the bodily adjustment of said shaft to and from the turret.

15. The device of claim 12 in which the cutter means comprises a plurality of cutters spaced angularly about the path of turret rotation and each including cutters axially spaced to act upon work pieces at points exposed between the points at which the work pieces are clampingly engaged by the relatively fixed and movable jaws of the turret, the respective cutter means being individually adjustable toward and from the turret.

References Cited in the file of this patent

UNITED STATES PATENTS

| | | |
|---|---|---|
| 577,492 | Nash | Feb. 23, 1897 |
| 1,200,836 | Hendrich | Oct. 10, 1916 |
| 1,352,411 | Hutton | Sept. 7, 1920 |
| 1,384,756 | Hambuechen | July 19, 1921 |
| 1,813,340 | Conti | July 7, 1931 |
| 1,854,943 | Kunath | Apr. 19, 1932 |
| 2,236,150 | Maltby | Mar. 25, 1941 |
| 2,405,367 | Nichols | Aug. 6, 1946 |
| 2,716,449 | Larsen | Aug. 30, 1955 |
| 2,727,616 | Hensgen | Dec. 20, 1955 |